US012173504B2

(12) United States Patent
Holm et al.

(10) Patent No.: US 12,173,504 B2
(45) Date of Patent: Dec. 24, 2024

(54) ROOF WINDOW WITH A SET OF HINGES

(71) Applicant: VKR Holding A/S, Hørsholm (DK)

(72) Inventors: Michael Galsgård Holm, Roskilde (DK); Terkel Øhlenschlæger, Vanløse (DK)

(73) Assignee: VKR Holding A/S (DK)

( * ) Notice: Subject to any disclaimer, the term of this patent is extended or adjusted under 35 U.S.C. 154(b) by 0 days.

(21) Appl. No.: 18/288,388

(22) PCT Filed: Apr. 29, 2022

(86) PCT No.: PCT/DK2022/050089

§ 371 (c)(1),
(2) Date: Oct. 26, 2023

(87) PCT Pub. No.: WO2022/228635

PCT Pub. Date: Nov. 3, 2022

(65) Prior Publication Data

US 2024/0200335 A1 Jun. 20, 2024

(30) Foreign Application Priority Data

Apr. 29, 2021 (DK) ........................... PA 2021 70199

(51) Int. Cl.
*E05D 15/48* (2006.01)
*E04D 13/035* (2006.01)
*E05F 1/10* (2006.01)

(52) U.S. Cl.
CPC ..... *E04D 13/0357* (2013.01); *E04D 13/0354* (2013.01); *E05D 15/48* (2013.01);
(Continued)

(58) Field of Classification Search
CPC ...................... E05D 2015/487; E04D 13/0357
See application file for complete search history.

(56) References Cited

U.S. PATENT DOCUMENTS

| | | | |
|---|---|---|---|
| 2,287,563 | A | 6/1942 | Eric |
| 3,979,791 | A | 9/1976 | Collin |

(Continued)

FOREIGN PATENT DOCUMENTS

| | | |
|---|---|---|
| AU | 431315 | 3/1969 |
| DE | 868706 | 2/1953 |

(Continued)

OTHER PUBLICATIONS

International Search Report dated Jul. 29, 2022 issued in connection with International Application No. PCT/DK2022/050089, two (2) pages.

(Continued)

*Primary Examiner* — Catherine A Kelly
(74) *Attorney, Agent, or Firm* — Merek, Blackmon & Voorhees, LLC

(57) ABSTRACT

In the roof window, a stationary primary frame (1) with frame members includes two opposing side members (1*a*), a first secondary frame includes a sash (2) with two opposing side members (2*a*), and a second secondary frame including an intermediate frame (6) are provided. A lifting device (7) including a spring assembly (7*a*) acting on a lifting arm (7*b*) is inserted between the stationary primary frame (1) and the intermediate frame (6). A top hinge arrangement (8) is connected to the primary frame (1) and to the sash (2) and the intermediate frame (6) to define a first hinge axis (α1) at or near a top of the roof window in a first operational condition of the roof window. To provide a second operational condition of the roof window, the hinge arrangement comprises a set of hinges (10) connected to the intermediate frame (6) and to the sash (2) to define a second hinge axis of the roof window in the second operational condition of the roof window. Each of the hinges (10) comprises a frame hinge part, a sash hinge part, and a movement supporting
(Continued)

assembly with a linkage mechanism comprising a number of links and joints.

13 Claims, 12 Drawing Sheets

(52) U.S. Cl.
CPC ...... *E05F 1/1075* (2013.01); *E05D 2015/487* (2013.01); *E05Y 2201/626* (2013.01); *E05Y 2900/152* (2013.01)

(56) References Cited

U.S. PATENT DOCUMENTS

| | | | | | |
|---|---|---|---|---|---|
| 4,055,024 | A * | 10/1977 | Frank | E04D 13/0357 49/153 |
| 4,217,732 | A * | 8/1980 | Reichstadt | E04D 13/0357 49/386 |
| 4,446,597 | A * | 5/1984 | Dantzer-Sorensen | E05D 7/085 16/370 |
| 4,480,406 | A * | 11/1984 | Frank | E05D 15/48 49/153 |
| 4,796,331 | A * | 1/1989 | White | E05D 11/1007 16/334 |
| 5,271,124 | A * | 12/1993 | Sandell | E05D 7/085 16/370 |
| 5,568,702 | A * | 10/1996 | Frank | E04D 13/0357 49/153 |
| 5,581,941 | A * | 12/1996 | Sill | E05D 15/48 49/246 |
| 6,647,676 | B1 * | 11/2003 | Hansen | E04D 13/031 52/200 |
| 10,100,571 | B2 * | 10/2018 | Deman | E05D 3/186 |
| 10,287,809 | B2 * | 5/2019 | Holm | E05F 1/1246 |
| 11,028,627 | B2 * | 6/2021 | Ohlenschlaeger et al. | E05D 3/18 |
| 2021/0079702 | A1 * | 3/2021 | Ohlenschlaeger et al. | E05D 7/082 |
| 2024/0209665 | A1 * | 6/2024 | Holm | E05F 1/1246 |
| 2024/0209669 | A1 * | 6/2024 | Holm | E04D 13/0357 |
| 2024/0218720 | A1 * | 7/2024 | Holm | E05D 7/085 |

FOREIGN PATENT DOCUMENTS

| | | | | |
|---|---|---|---|---|
| DE | 2404054 | A1 * | 7/1975 | |
| DK | 114321 | | 6/1969 | |
| EP | 0022657 | | 1/1981 | |
| EP | 0089813 | | 3/1983 | |
| EP | 0733146 | | 9/1996 | |
| EP | 1038083 | | 9/2000 | |
| EP | 1781883 | | 5/2007 | |
| EP | 1873323 | | 1/2008 | |
| EP | 17151385 | | 11/2013 | |
| EP | 2740852 | A2 * | 6/2014 | E04D 13/0357 |
| EP | 2762665 | | 8/2014 | |
| EP | 2770146 | | 8/2014 | |
| EP | 2770149 | | 8/2014 | |
| EP | 2245242 | | 10/2015 | |
| EP | 3252255 | | 12/2017 | |
| WO | WO08910460 | | 11/1989 | |
| WO | WO-2009058039 | A1 * | 5/2009 | E04D 13/0357 |
| WO | WO2017076416 | | 5/2017 | |
| WO | WO2018202915 | | 11/2018 | |
| WO | WO2019101281 | | 5/2019 | |
| WO | WO2021006096 | | 1/2021 | |

OTHER PUBLICATIONS

International Preliminary Report on Patentability dated Jul. 27, 2023 issued in connection with International Application No. PCT/DK2022/050089, seven (7) pages.

Danish Search Report dated Nov. 10, 2021 issued in connection with Danish Patent Application No. PA 2021 70199, eleven (11) pages.

Danish Examination Report dated May 30, 2022 issued in connection with Danish Patent Application No. PA 2021 70199, five (5) pages.

Danish Examination Report dated Feb. 20, 2023 issued in connection with Danish Patent Application No. PA 2021 70199, two (2) pages.

U.S. Appl. No. 18/288,303, filed Oct. 25, 2023 for "Hinge for a Roof Window and Roof Window With a Set of Hinges".

U.S. Appl. No. 18/288,385, filed Oct. 26, 2023 for "Hinge for a Roof Window and Roof Window With a Set of Hinges".

U.S. Appl. No. 18/288,387, filed Oct. 26, 2023 for "Hinge for a Roof Window and Roof Window With a Set of Hinges".

* cited by examiner

ROOF WINDOW WITH A SET OF HINGES

TECHNICAL FIELD

The present invention relates to a roof window comprising a stationary primary frame having a plurality of frame members including at least two opposing side members, a first secondary frame including a sash having a plurality of sash members including at least two opposing side members, a second secondary frame including an intermediate frame, a lifting device including a spring assembly acting on a lifting arm inserted between the stationary primary frame and the intermediate frame, the lifting arm being at one end rotatably connected with a sledge system slidably connected with the primary frame and coupled to the spring assembly, and at another end rotatably connected with the intermediate frame, a top hinge arrangement connected to the primary frame and to the sash and the intermediate frame to define a first hinge axis at or near the top of the roof window in a first operational condition of the roof window, and a hinge arrangement comprising a set of hinges connected to the intermediate frame and to the sash to define a second hinge axis of the roof window to provide a second operational condition of the roof window, each of said hinges comprising a frame hinge part, a sash hinge part, and a movement supporting assembly comprising guiding means configured to allow the sash hinge part to assume an angle relative to the frame hinge part substantially around said second hinge axis during an opening movement from a closed position to an open position and during a closing movement from the open position to the closed position in the second operational condition of the roof window, the frame hinge part of each hinge being connected to the intermediate frame, and the sash hinge part of each hinge being connected to one of said sash side members, the frame hinge part comprising a base plate defining a hinge plane substantially perpendicular to the second hinge axis of the roof window and the sash hinge part comprising a base plate substantially parallel to the base plate of the frame hinge part.

BACKGROUND ART

Windows for installation in an inclined roof surface may be provided in a number of varieties and include more or less complicated operational structures to allow opening of the sash and to fulfil other functions, such as ventilation. Such roof windows include the type hinged at or near the centre, the top-hinged type, and finally the roof windows that are top-hinged during normal operation but in which the sash is able to perform a rotating movement substantially at a centre axis, either for cleaning or for providing an alternative manner of operation. Roof windows of the top-hinged type have a first hinge axis provided by a top hinge arrangement to provide a first operational condition, whereas rotation of the sash in a second operational condition is performed by means of an intermediate frame in which the sash is hinged to provide a secondary hinge axis. Typically, one hinge of the hinge arrangement will be located at either side of the roof window to define a substantially horizontal hinge axis.

Examples of top-hinged windows with a second operational condition are for instance disclosed in Applicant's WO-A-89/10460, EP 0 733 146 B1, EP 1 873 323 B1, EP 2 762 665 A2, and WO 2019101281 A1. To make it possible to rotate the window sash approximately 180° to a convenient cleaning position, the sash structure is connected with an intermediate frame with frame arms, which in the closed position of the window are positioned between the upper parts of the frame and sash side members, and which during normal use of the window as a top-hung window follow the sash side members.

In roof windows in which the operation takes place either entirely or partially about a hinge axis at the top, it is known to balance at least part of the weight of the movable components by means of a lifting device. The purpose of this arrangement is to facilitate opening of the window, and the dimensions may be chosen so that the spring can retain the top-hinged frame in equilibrium in a desired open position.

Basically, the hinges of the hinge arrangement providing the second operational condition in such a roof window need to fulfil a number of requirements, in particular with regard to the movement pattern required to allow an overlap between the cover members fastened to the intermediate frame and the counterpart cover members fastened to the sash to be established in the closed position of the roof window.

One very well-proven type of hinge providing the required pattern of movements is the pivot hinge, which includes a guidance on the frame hinge part cooperating with a slide rail on the sash hinge part. Such pivot hinges are for instance disclosed in Applicant's EP 1 038 083 B1 and EP 1 781 883 B1 and are very versatile as regards operational areas and adaptation of components. Examples of roof windows incorporating such adapted hinges are shown in Applicant's published European patent applications EP 2 770 146 A1 and EP 2 770 149 A1.

However, although the hinges in the above examples are to some extent capable of providing the kinetic and kinematic performances aimed at, there is still room for improvement.

SUMMARY OF INVENTION

With this background it is an object of the present invention to provide the roof window with an increased design flexibility including a hinge with the desired movement pattern and ease of operability.

This is achieved with a roof window of the kind mentioned in the introduction, which is further characterised in that the guiding means comprise a linkage mechanism including at least two links providing connection between the sash hinge part and the frame hinge part, each link being connected to at least one of the frame hinge part and the sash hinge part at a joint and connected to each other in a bearing axle, that at least one of the joints between the links and the frame and sash hinge parts comprises a sliding joint cooperating with a guide track and at least one other joint of said joints is selected from the group comprising a sliding joint and a hinged joint, and that the at least two links comprise a sash link providing connection between the bearing axle and the frame hinge part, and a frame link providing connection between the bearing axle and the sash hinge part.

By forming the set of hinges which is functional in the second operational condition as a so-called pantograph hinge, the desired flexibility and smooth operation are achieved.

Moreover, by including a suitable number of links and a suitable selection of joints in the linkage mechanism, a desirable movement pattern is achieved and a more compact and secure connection between the hinge and the frame and/or sash of the roof window. Therefore, operation of the sash in the second operational condition of the roof window may be further facilitated. By the term "link" it is to be understood an element in the form of a substantially rigid body retaining its shape throughout its motion.

The bearing axle enables a rotational relative movement between the links and is not fixed relative to any of the hinge parts and is thus able to move freely during the opening and closing movements. The links are therefore movable relative to the respective base plates of the hinge parts. In this way, a compact configuration of the hinge is achieved while maintaining suitable degrees of freedom.

In a presently preferred embodiment, the frame link is connected to the sash hinge part in a sliding joint and the sash link is connected to the frame hinge part in a sliding joint. In this way, a translational movement is enabled and additional degrees of freedom obtained.

In another presently preferred embodiment, one guide track is provided in a respective link of the linkage mechanism. This is a mechanically simple solution which furthermore facilitates operation, by which a smooth and stable movement in the guide track is achieved.

In another presently preferred embodiment, the guide track is provided in the sash link and the frame link, and the sliding joint is provided on a hinge part, preferably on the frame hinge part and/or the sash hinge part, more preferably on the base plate of the frame hinge part and/or the sash hinge part. This configuration allows for accurate control of the force conditions of the kinematic pattern and output forces.

Other presently preferred embodiments and further advantages will be apparent from the subsequent detailed description and drawings.

BRIEF DESCRIPTION OF DRAWINGS

In the following description, embodiments of the invention will be described with reference to the drawings, in which.

DESCRIPTION OF EMBODIMENTS

In the following, embodiments of the inventive hinge and roof window will be described in further detail. When referring to the Figures, the terms up, down, upwards, downwards, top and bottom are taken relative to how the figures are displayed. A front view is taken from the hinge and viewing towards the frame. A view from behind is therefore taken as viewed from the frame towards the hinge. A longitudinal direction is, if nothing else is mentioned, longitudinal along the length of a member. It is to be understood that the arrangement shown in a horizontal orientation is not the normal orientation as the window is installed in an inclined roof.

Figure 1:
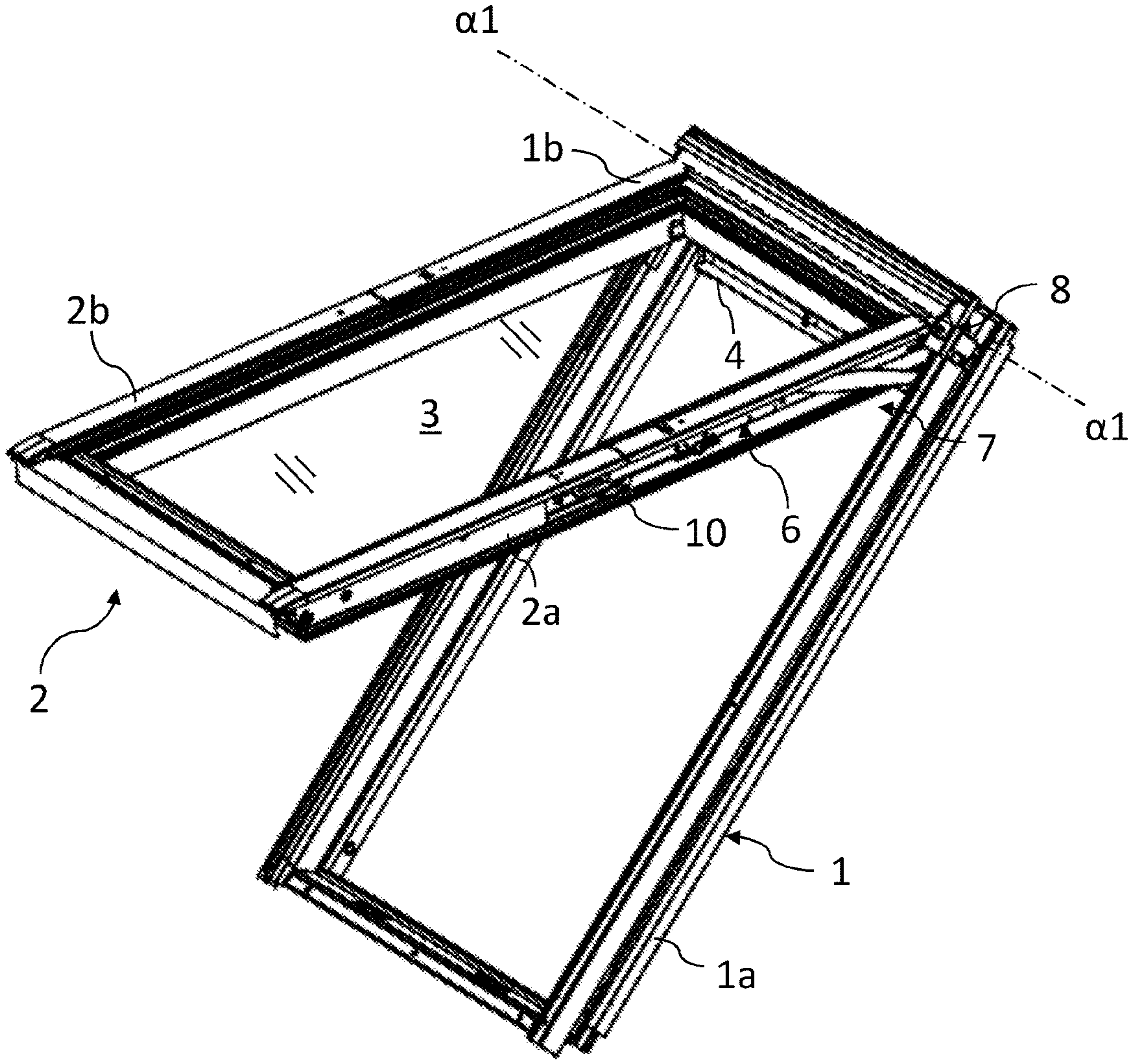
FIG. 1 is a perspective view of a roof window in an embodiment according to the invention, in a first operational condition.
Figure 2:
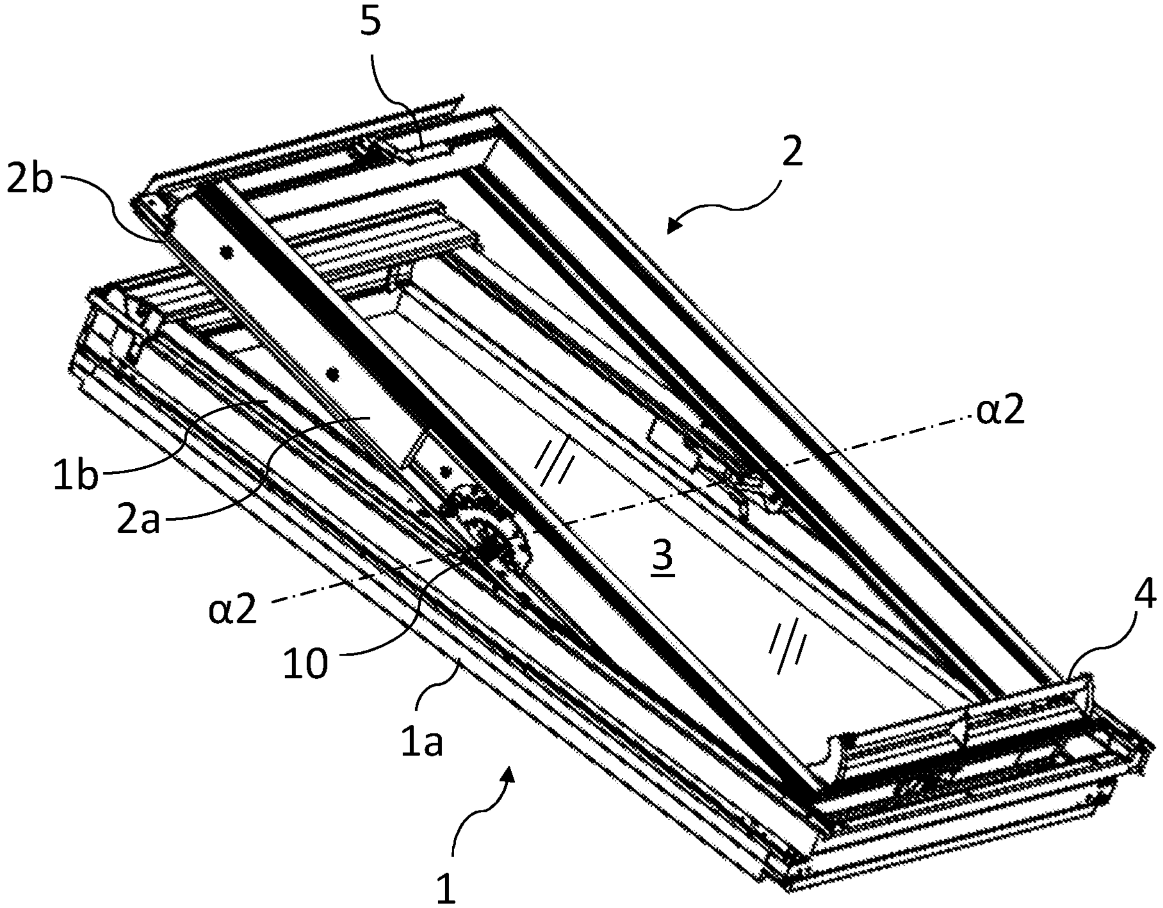
FIG. 2 is a perspective view of the roof window of FIG. 1 in a second operational condition.

Initially, reference is made to FIGS. 1 and 2 in which a roof window according to the invention is shown, including a set of hinges of which one hinge 10 is indicated. The hinge 10 is representative of the hinges of the below embodiments. The roof window is top-hinged in a first operational condition, here denoted normal operation, around a first hinge axis $\alpha 1$, and provides for an additional, second operational condition around a second hinge axis $\alpha 2$ as shown in FIG. 2. The principles underlying the functionality of such a dual-operation roof window are shown and described in detail in Applicant's above-mentioned WO 2019/101281 A1, the contents of which are hereby incorporated by reference.

The roof window comprises a primary frame in the form of a frame 1 configured for installation in an inclined roof surface and which remains stationary in use of the roof window. A first secondary frame in the form of a sash 2 carrying a pane 3 is provided, and a second secondary frame in the form of an intermediate frame 6 is connected to the frame 1 and to the sash 2. The frame 1 and sash 2 is each formed by four members of which one frame side member 1*a* and one sash side member 2*a* is indicated.

The intermediate frame 6 is connected to the stationary frame 1 by a top hinge arrangement generally designated 8 and to the sash 2 via the set of hinges 10.

Figure 3:
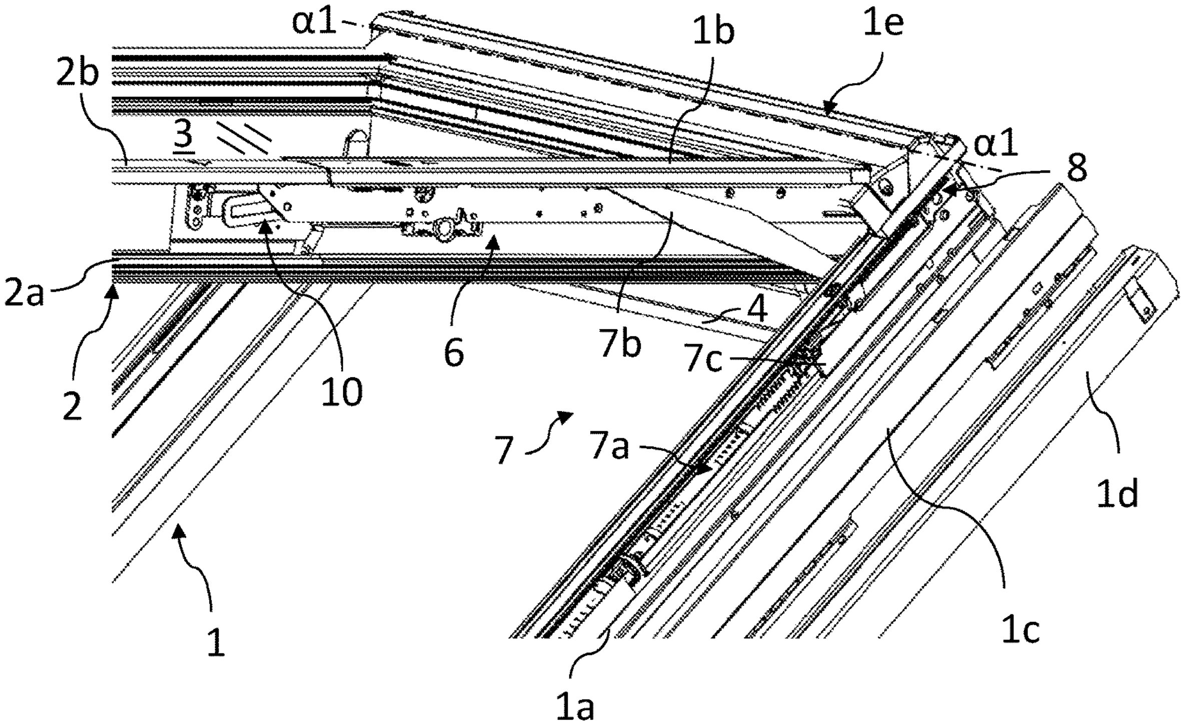
FIG. 3 is a partial perspective view of one upper corner of an embodiment of the roof window, shown in the first operational condition.
Figure 4A:
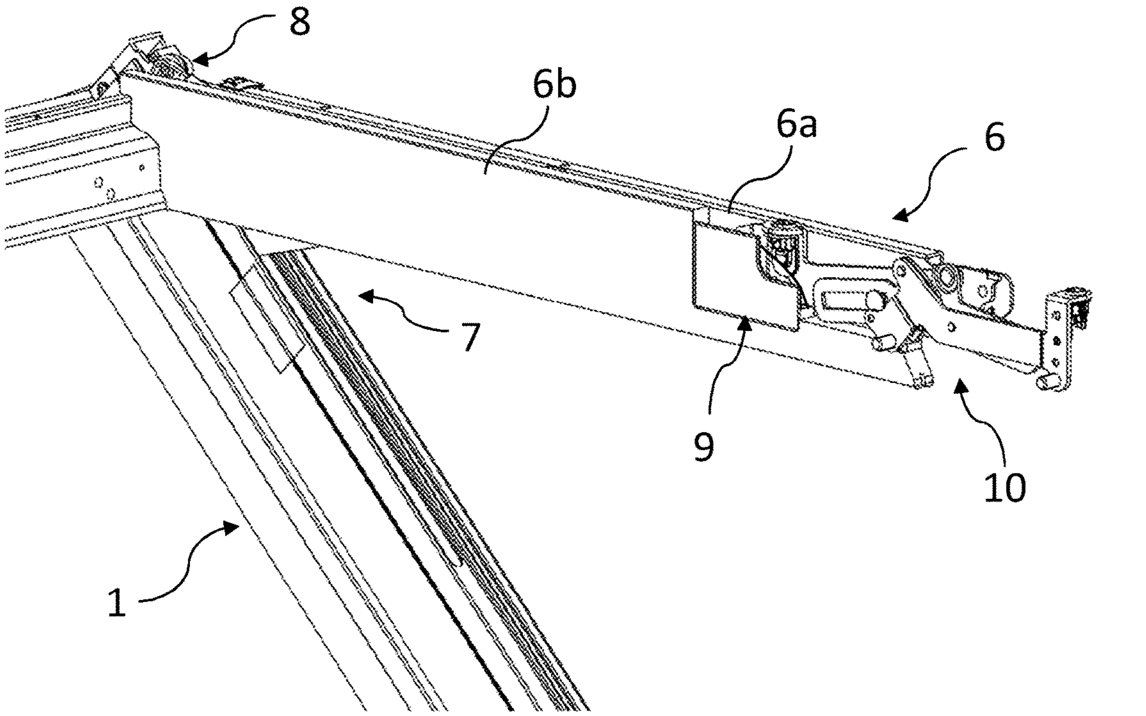
FIG. 4*a* is a partial perspective view of one upper corner of an embodiment of the roof window, with details of the sash removed for clarity.

Referring now also to FIGS. 3 and 4*a*, the intermediate frame 6 comprises in the embodiment shown a profile element 6*a* of for instance a metal material, and here also an inner element 6*b*. The inner element 6*b* may for instance be formed by the same material as portions visible from inside the building of the members of the frame 1 and sash 2, for instance wood or polyurethane. It is noted that the intermediate frame 6 takes the form of an arm, and a similar intermediate frame (not indicated) is present at the other side of the roof window.

The hinge 10 is shown in its mounted condition, located near the end of the profile element 6*a* of the intermediate frame 6, opposite relative to the top hinge arrangement 8. The connection of the hinge 10 to the intermediate frame 6 and the sash 2, respectively, will be described in detail further on.

A lifting device 7 includes a spring assembly 7*a* acting on a lifting arm 7*b*, which is inserted between the stationary primary frame 1 and the intermediate frame 6. The lifting arm 7*b* is at one end rotatably connected with a sledge system 7*c* slidably connected with the frame 1 and coupled to the spring assembly 7*a*. At the other end, the lifting arm 7*b* is rotatably connected with the intermediate frame 6.

To protect the interior and the components of the window itself and to ascertain weather-proof transition to the surrounding roofing, the roof window comprises a covering, including flashing members (not shown), cladding and covering elements of which a frame side covering element 1*b* and sash side covering element 2*b* are shown. Other covering elements are typically present as well, including a side frame covering 1*d* (shown exploded from the frame side member 1*a*) and a top covering generally designated 1*e*. Also visible in FIG. 3 is a side frame support element 1*c*, shown exploded from the frame side member 1*a*.

From a closed position, the user operates the operating device of the window. To open the roof window in the first operational condition, i.e. in normal use as a top-hung window, the operating device comprises a handle 5 connected with the sash bottom member and interacting with a striking plate (not shown) in the frame bottom member. When the handle 5 is rotated, the engagement with the striking plate in the frame bottom member is released and the sash 2 and intermediate frame 6 are rotated about the first hinge axis $\alpha 1$, the force applied by the user being assisted by the bias of the spring assembly 7*a* of the lifting device 7 acting on the lifting arm 7*b* inserted between the stationary frame 1 and the intermediate frame 6. In turn, the lifting arm 7*b* exerts a moment on the intermediate frame 6 and hence on the sash 2. Closing the window from the open position entails the opposite movements of the sash 2 and relevant parts of the lifting device 7. A similar lifting device may be provided at each side of the roof window.

To operate the roof window in the second operational condition, an operating and locking assembly 4 including a ventilation flap is provided at the sash top member. The operating and locking assembly 4 is provided with a lock mechanism to interact with a striking plate (not shown) on the frame top member. The sash 2 is also able to be rotated in the second operational condition, for instance to allow cleaning of the outside of the pane 3 from the inside of the building in which the roof window is installed. Depending on the position of the hinge axis in the height direction of the roof window, the sash 2 may be rotated substantially through 180° to attain the position shown in FIG. 2.

Figure 4B:
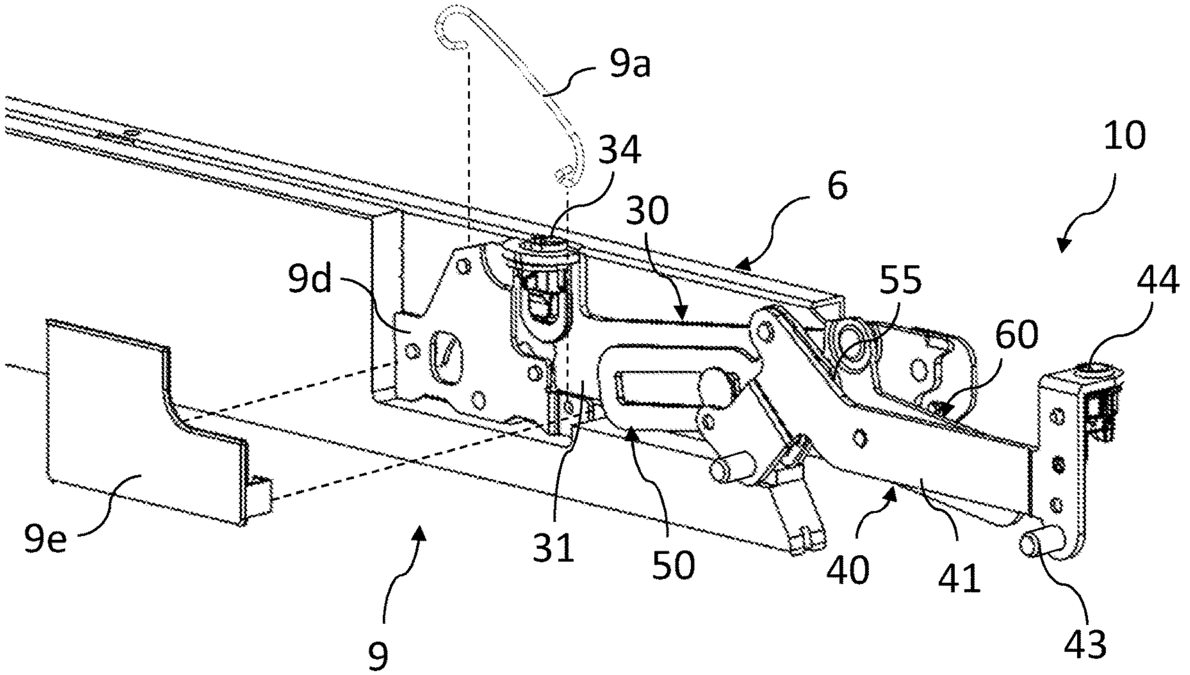
FIGS. 4*b* and 4*c* are partial perspective views of details of FIG. 4*a*, with some parts shown exploded.
Figure 4C:
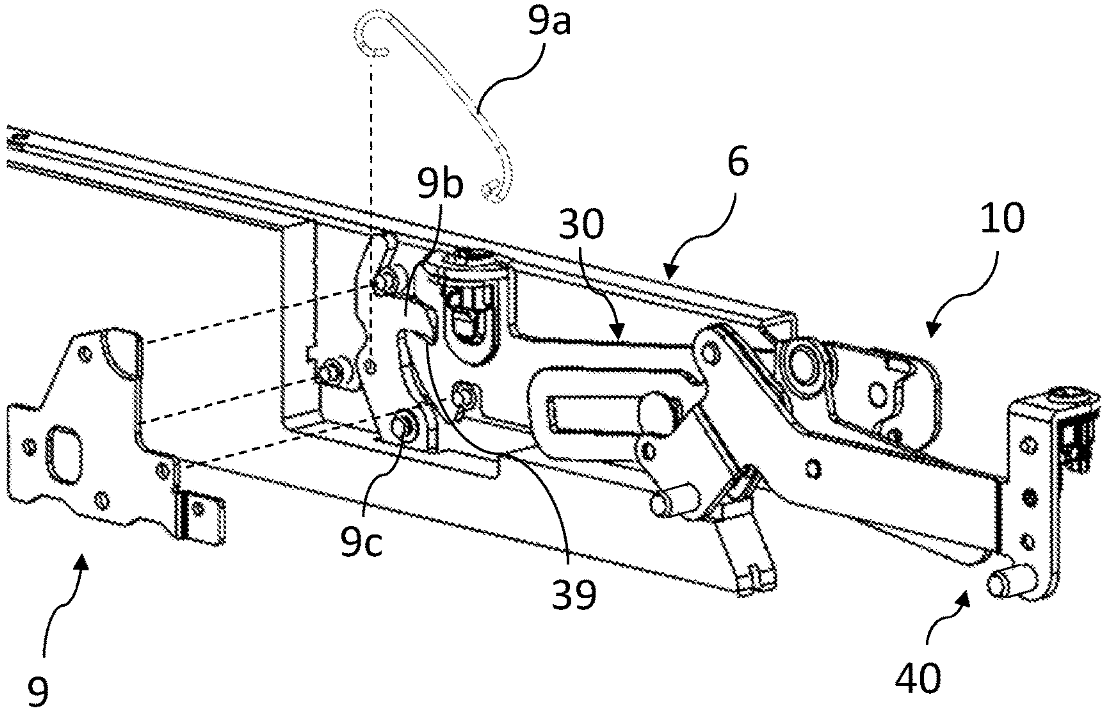
Figure 4D:
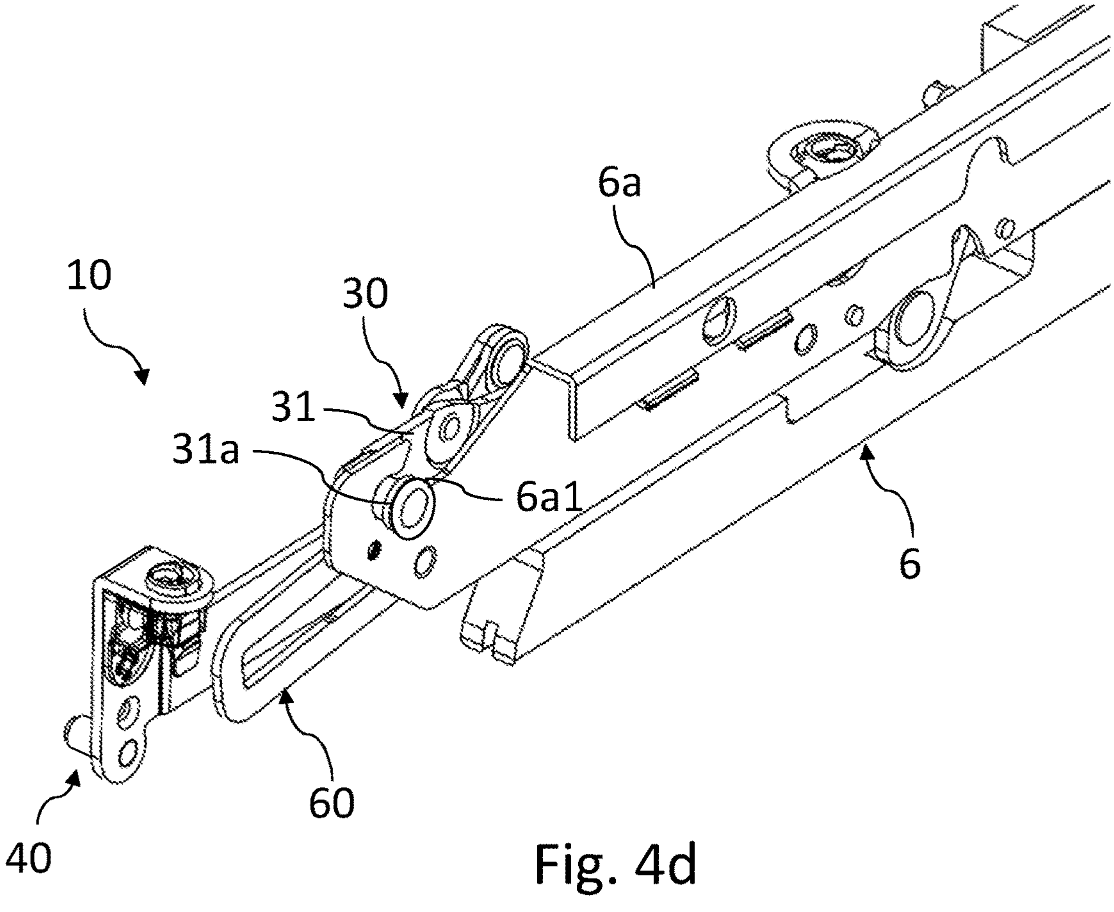
FIG. 4*d* is a view of details of FIG. 4*a*, seen from another angle.
Figure 5:
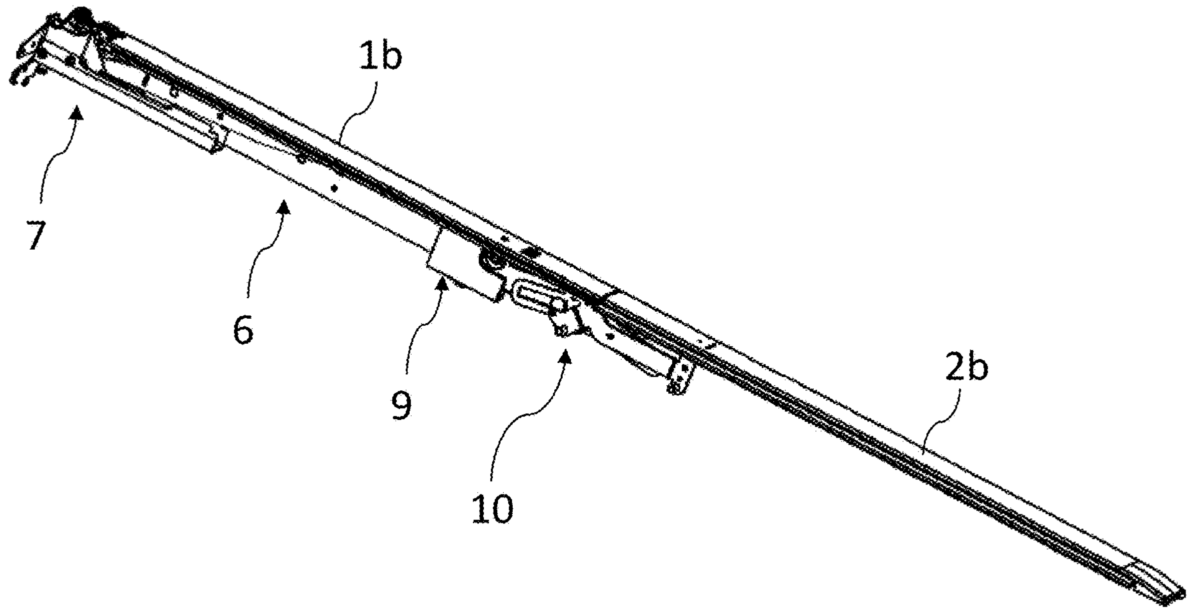
FIGS. 5 and 6 are perspective views of details of the roof window in an embodiment of the invention, in a closed position and during opening in the second operational condition, respectively.
Figure 6:
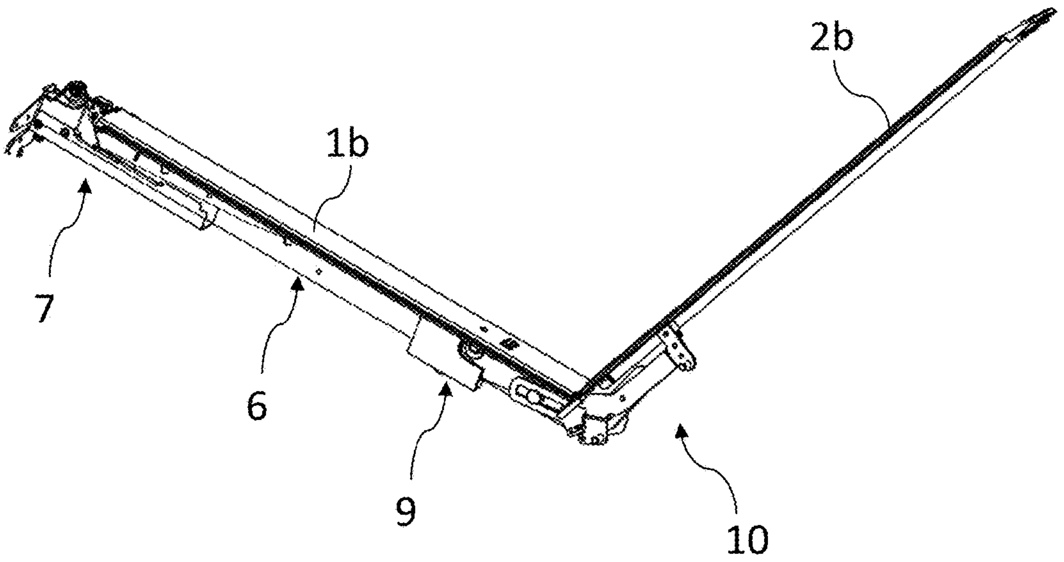
Figure 7:
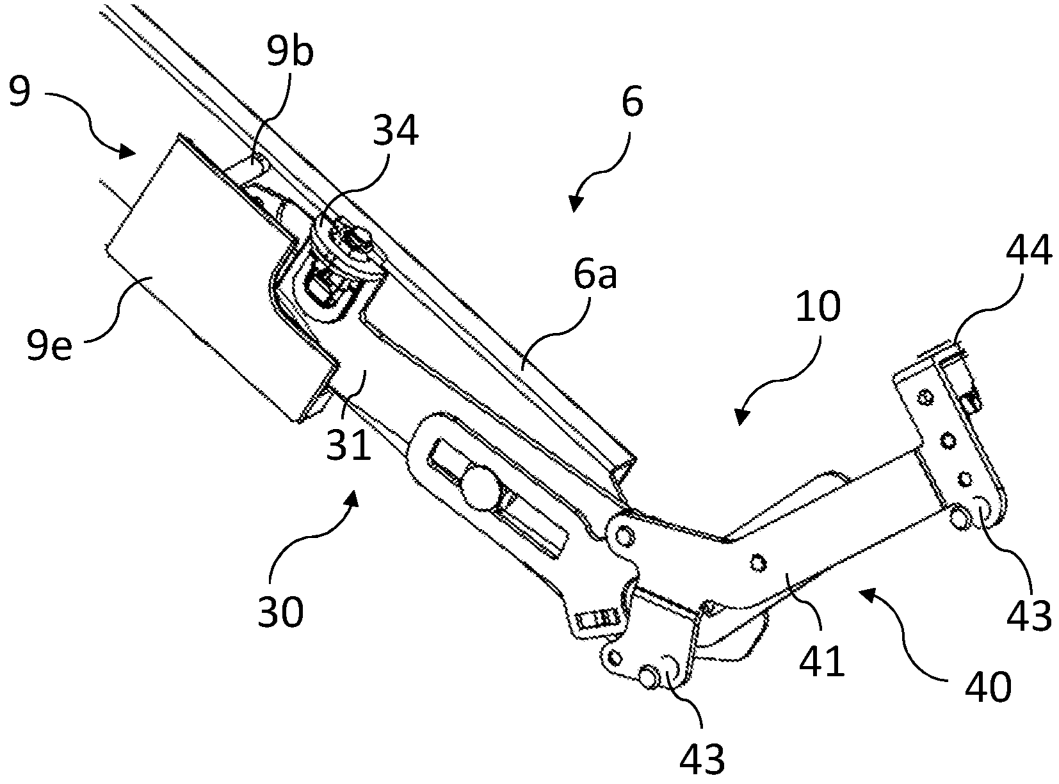
FIGS. 7 to 9 are partial perspective views of details of the embodiment of FIGS. 5 and 6, in the position shown in FIG. 6.

The hinge 10 of the roof window in the embodiment of the invention will now be described in detail. Particular reference is made to FIGS. 4*a* to 4*d*, and also to FIGS. 7 to 9 and 10*a* to 12, showing the hinge 10 in various positions. FIGS. 5 and 6 show the relative position of details of the roof window in a closed position and a partially open position in the second operational condition, respectively.

The hinge 10 comprises a frame hinge part 30 and a sash hinge part 40 configured to assume an angle relative to the frame hinge part 30. The hinge 10 forms part of a set of hinges, of which the frame hinge part 30 of each hinge 10 in the embodiment shown is configured to be connected to the profile element 6*a* of the intermediate frame 6 of the roof window in the mounted condition, and the sash hinge part 40 is correspondingly configured to be connected to the sash side member 2*a*. It is appreciated that reference is made to one hinge only, and that components of the other hinge of the set of hinges may comprise mirror-inverted details.

A base plate 31 of the frame hinge part 30 defines a hinge plane substantially perpendicular to the second hinge axis $\alpha 2$ of the window in the mounted condition of the hinge, a base plate 41 of the sash hinge part 40 being substantially parallel to the base plate 31 of the frame hinge part 30.

The frame hinge part 30 and the sash hinge part 140 are furthermore provided with holding clips 34, 44 for connecting the covering elements 1*b*, 2*b*, respectively.

It is noted that during the entire opening and closure movement, the respective planes of the base plates of the frame hinge part and the sash hinge part are at all times kept substantially parallel, thus avoiding transverse movements perpendicular to the hinge plane as defined by the base plates 31, 41.

A movement supporting assembly comprising guiding means configured to allow the sash hinge part 40 to assume an angle relative to the frame hinge part 30 substantially around the second hinge axis $\alpha 2$ in the second operational condition of the roof window is provided.

The guiding means of each hinge 10 comprises a linkage mechanism including at least two links 50, 60 providing connection between the sash hinge part 40 and the frame hinge part 30. Each link is connected to at least one of the frame hinge part 30 and the sash hinge part 40 at a joint and connected to each other in a joint capable of at least rotation. This type of hinge is generally referred to as a pantograph hinge.

According to the invention, there are two links connected to each other in a bearing axle 55. The links comprise a sash link 50 providing connection between the bearing axle 55 and the frame hinge part 30, and a frame link 60 providing connection between the bearing axle 55 and the sash hinge part 40.

Figure 8:
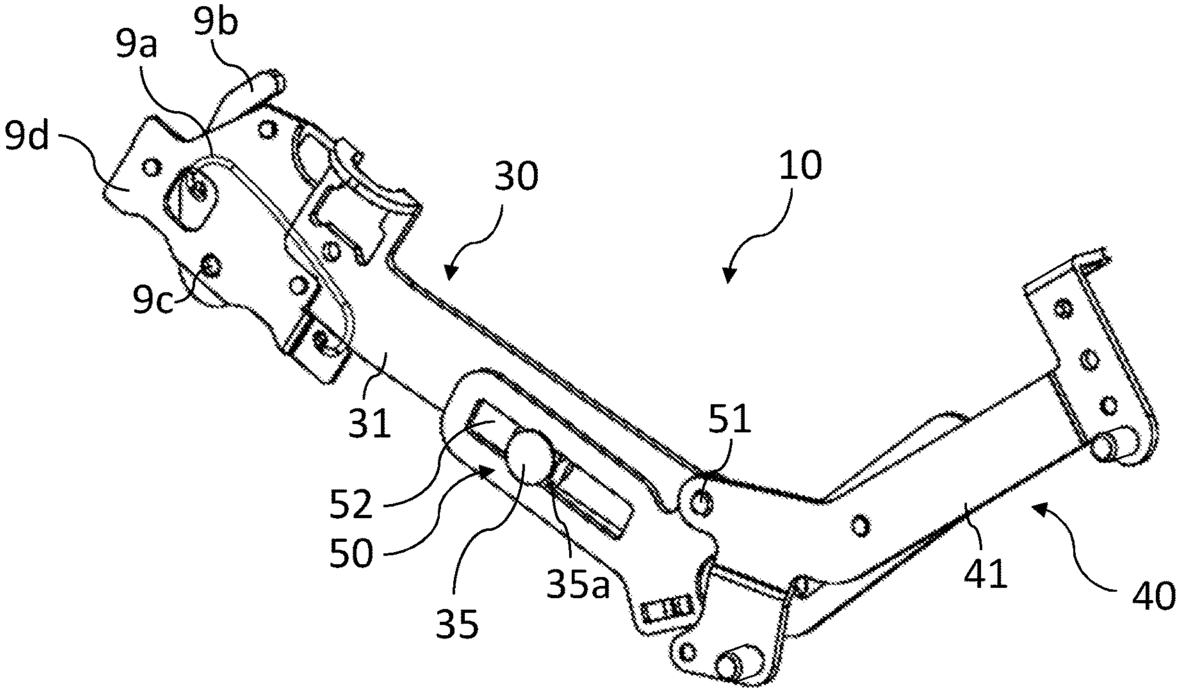
Figure 9:
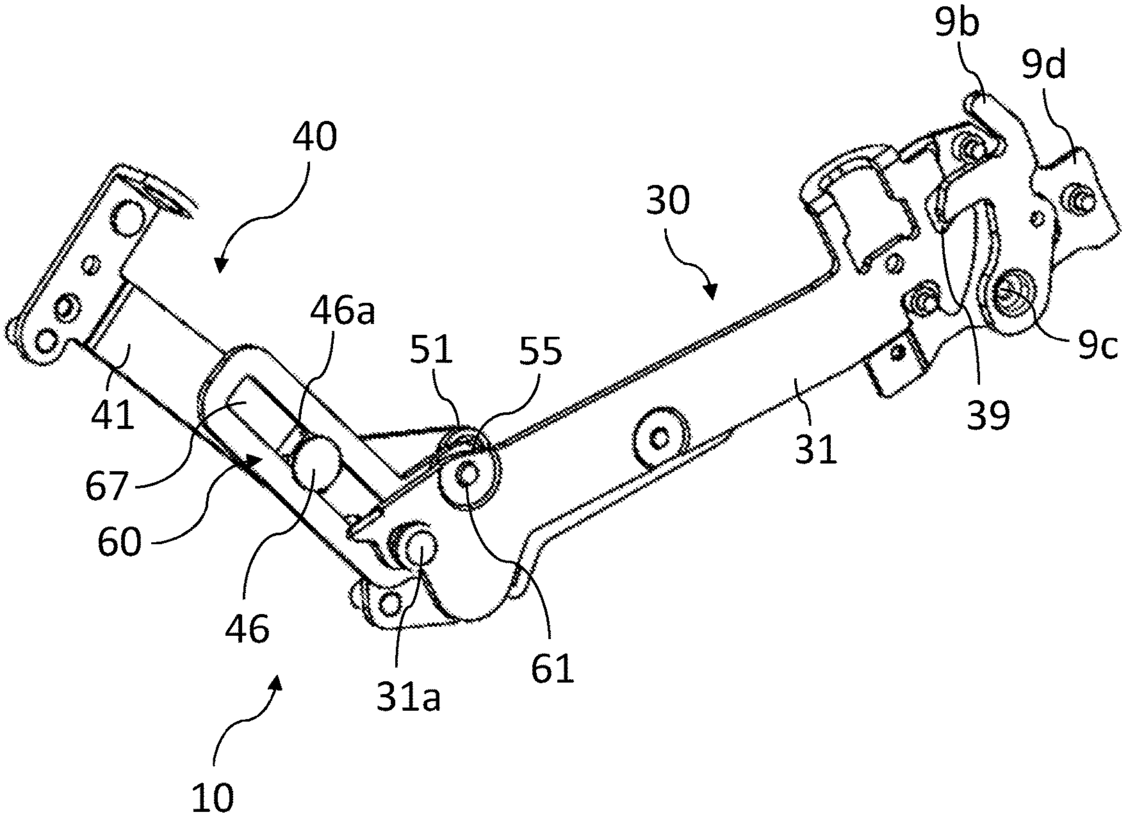
Figure 10A:
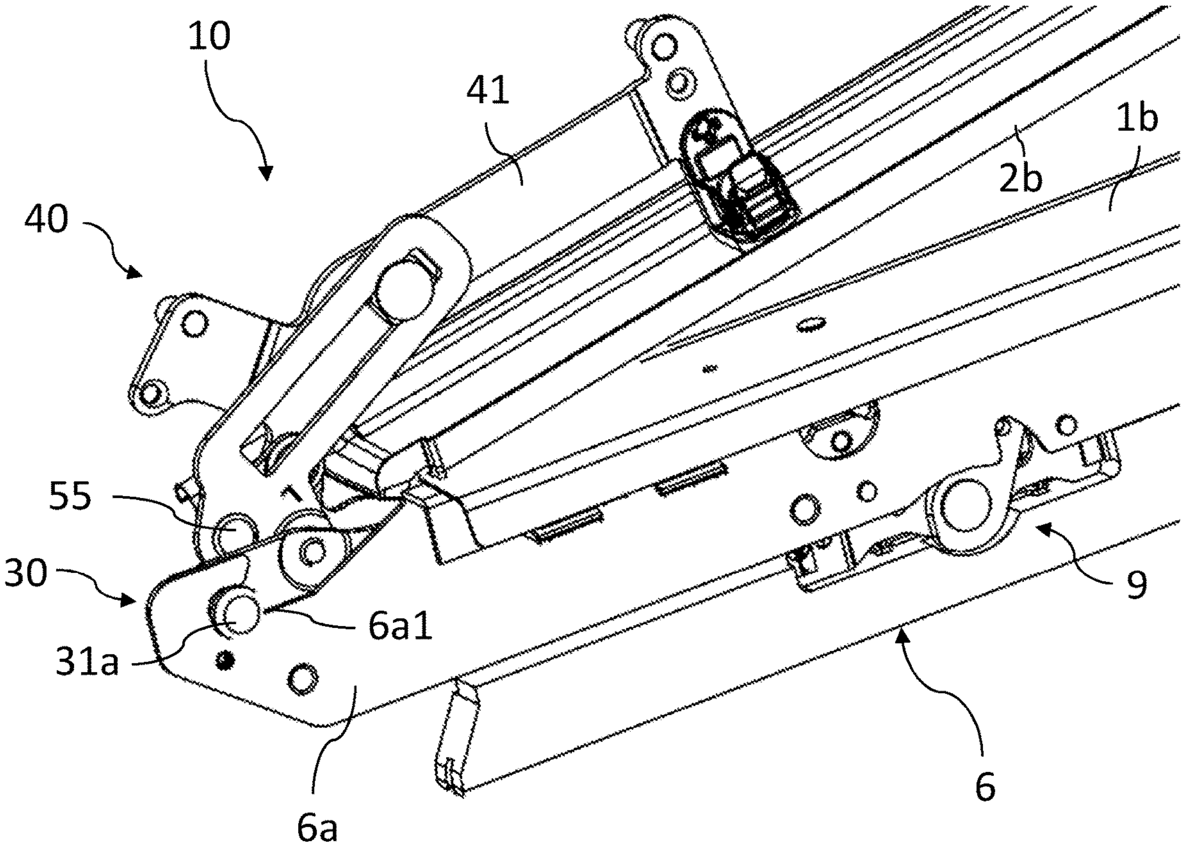
FIG. 10*a* is a partial perspective view of an embodiment of a roof window in the second operational condition, and in a fully reversed position corresponding substantially to the position shown in FIG. 2.
Figure 10B:
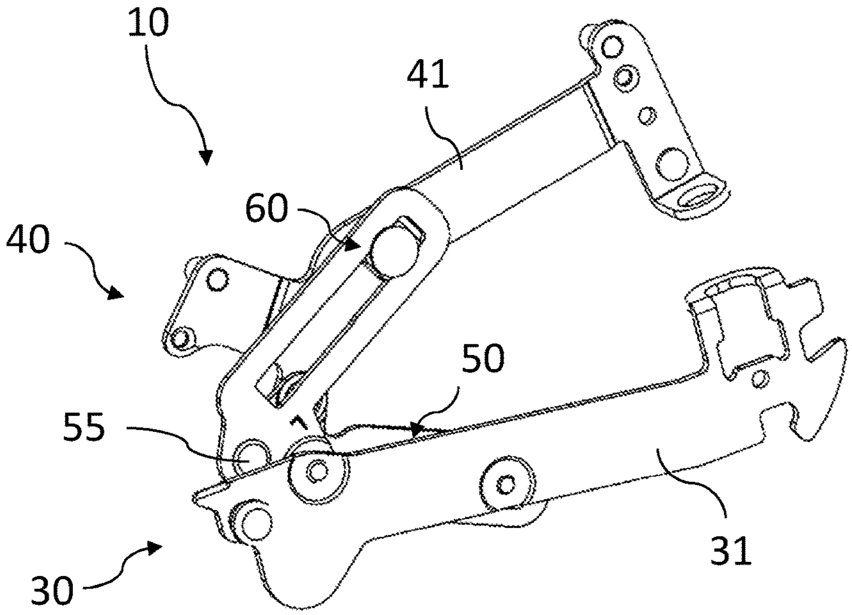
FIG. 10*b* is a perspective view of the hinge of the roof window of the embodiment of FIG. 10*a;*
Figure 11:
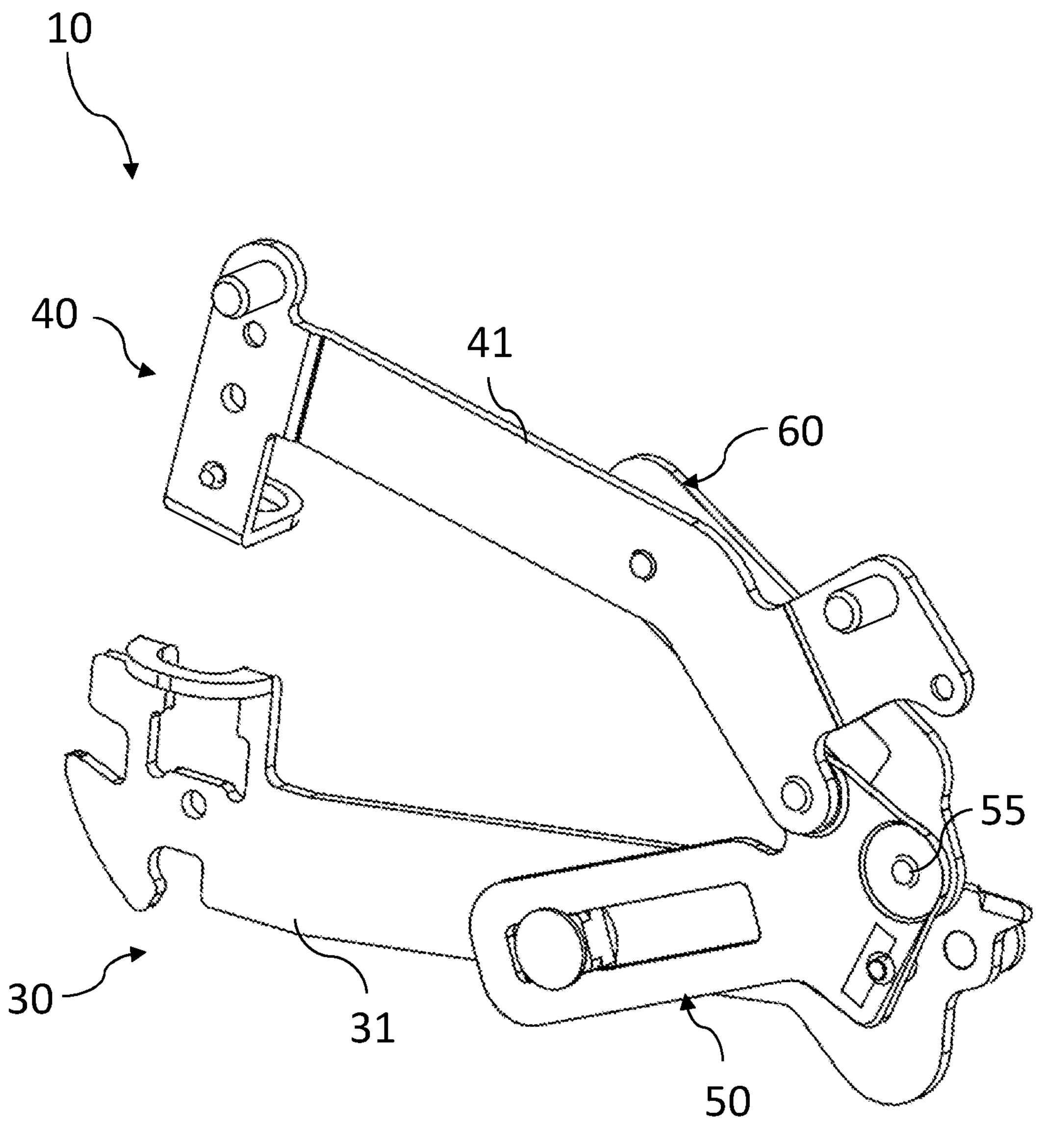
FIG. 11 is a perspective view of the hinge of FIG. 10*b*, seen from another angle.
Figure 12:
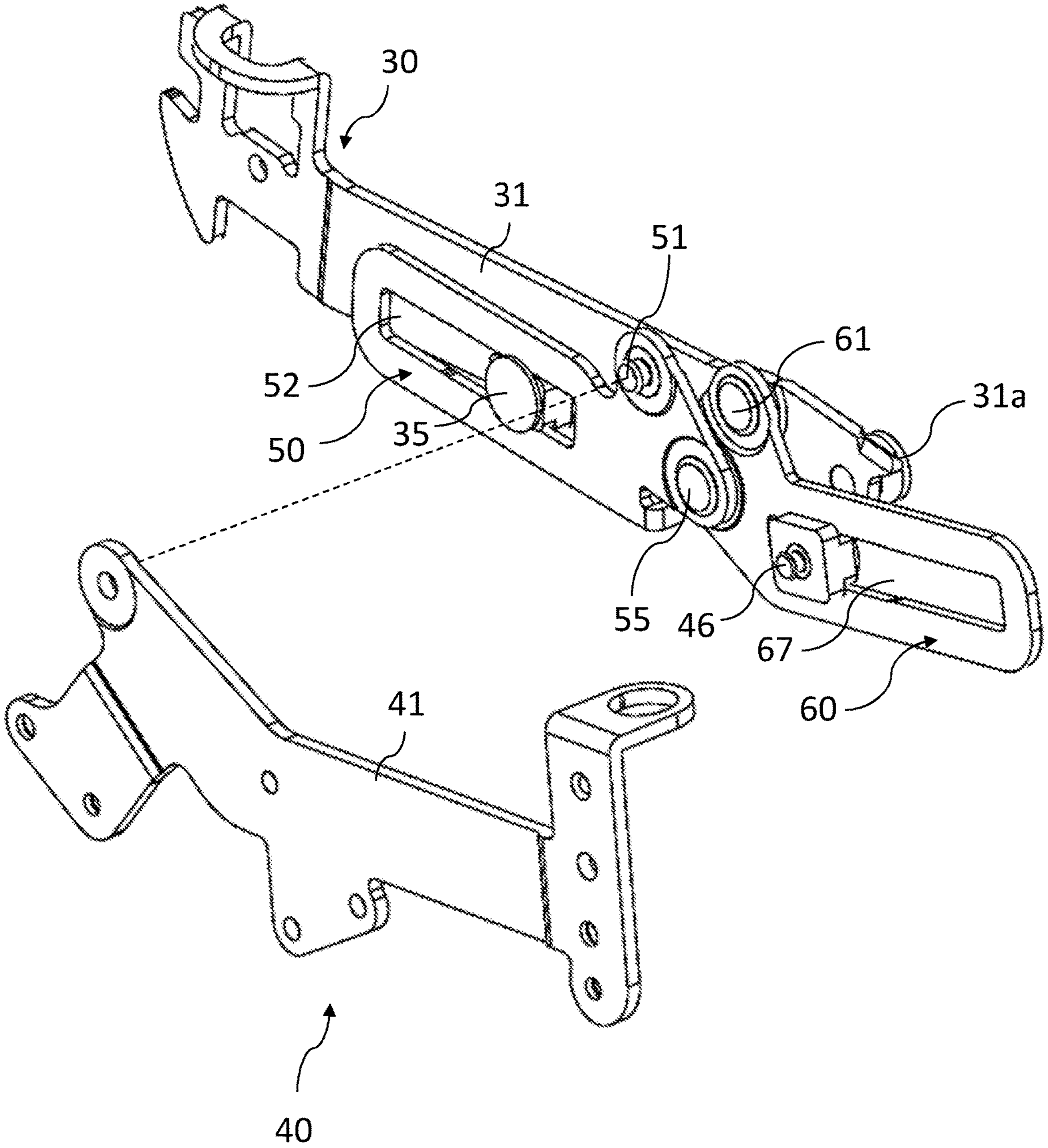
FIG. 12 is an exploded view of the hinge of a roof window in another embodiment.

Referring in particular to FIGS. 8 and 9 for easy overview, the joints between the links 50, 60 and the frame and sash hinge parts 30, 40 in the embodiments shown comprise two sliding joints 35, 46 cooperating with a respective guide track 52, 67. Sliding joint 35 is fastened to the base plate 31 of the frame hinge part 30 and sliding joint 46 is fastened to the base plate 41 of the sash hinge part 40. The sliding connection to the respective guide track 52, 67 is provided by a sliding block 35*a*, 46*a*, preferably of a low-friction, durable material. The sliding connection may also include a pin and/or an axle, either alone, or in combination with the sliding block. The frame link 60 is furthermore connected to the base plate 31 of the frame hinge part 30 in a hinged joint 61, and the sash link 50 is connected to the base plate 41 of the sash hinge part 40 in a hinged joint 51. Furthermore, other joints and other links may be provided as well to provide the desired functionality, including further sliding joints and/or hinged joints.

Connection of the hinge 10 to the sash 2 and to the intermediate frame 6 will be described in the following, with particular reference to FIGS. 4*b* to 4*d*.

The sash hinge part 40 comprises fastening means in the form of pins or spigots 43 introduced into suitable holes in the sash side member 2*a* of the sash 2. In a supply condition, each hinge 10 of the set of hinges may either be connected to the sash 2, or supplied separately ready for connection and subsequently mounted by introducing the spigots 43 into the sash side member 2*a* in preparation of an installation process of the roof window. Due to the configuration of the hinge 10, the sash link 50 and the frame link 60 are provided connected with each other by means of the bearing axle 55, and thus form a coherent structure.

In order to connect the hinge 10 to the intermediate frame 6, the frame hinge part 30 is connected to the intermediate frame 6 by means of a coupling device comprising a first engagement means and a second engagement means. In the case that the frame hinge part 30 and the sash hinge part 40 are both already connected to the sash 2 in preparation of the installation, the below description applies to the mounting of the sash 2 relative to the intermediate frame 6 as well:

The mounting takes place by first activating the first engagement means, which in the embodiment shown comprise a rivet 31*a* on the base plate 31 of the frame hinge part 30, and a slot 6*a*1 in the profile element 6*a* of the intermediate frame 6. This is carried out by aligning each hinge 10 of the sash 2 in the appropriate position opposite the intermediate frame 6 such that the rivet 31*a* is slid into the slot 6*a*1 to provide a temporary engagement, in which the sash 2 is carried by the intermediate frame 6, but the engagement is not yet locked. Following this, the second engagement means are activated. In the embodiment shown, the second engagement means comprise a latch arrangement 9 including a rotatable hook element 9*b* configured to engage releasably with a recess 39 in the base plate 31. Once the hook element 9*b* is engaged in the recess 39, the base plate 31 of the frame hinge part 30 is locked to the intermediate frame 6. Thus, in the contemplated configuration, the entire hinge 10 and accompanying sash 2 will be secured relative to the intermediate frame 6.

In the embodiment shown, the latch arrangement 9 is biased, as shown by a spring 9*a*. The spring 9*a* engages with a support plate 9*d* fastened to the profile element 6*a* of the intermediate frame 6 and with the hook element 9*b* to bias the hook element 9*b* towards the locked position where it engages the recess 39.

As is seen, the support plate 9*d* has such an extension that a rotational joint 9*c* for the hook element 9*b* is located below the profile element 6*a* of the intermediate frame 6. This provides a longer moment arm compared to a position within the profile element 6*a* of the intermediate frame 6.

To protect the parts of the latch arrangement 9 from entry of dust etc., the latch arrangement 9 comprises a cover 9*e* in the embodiment shown. This also protects the user from insight and tampering in normal use of the roof window.

The engagement between the frame hinge part 30 and the intermediate frame 6 is releasable, for instance in order to remove the sash to provide maintenance on the sash 2 and/or the roof window in its entirety. This is accomplished by rotating the hook element 9*b* against the bias of the spring 9*a* to withdraw the hook element 9*b* from the recess 39, following which the engagement of the rivet 31*a* with the slot 6*a*1 is released as well.

Figure 13:
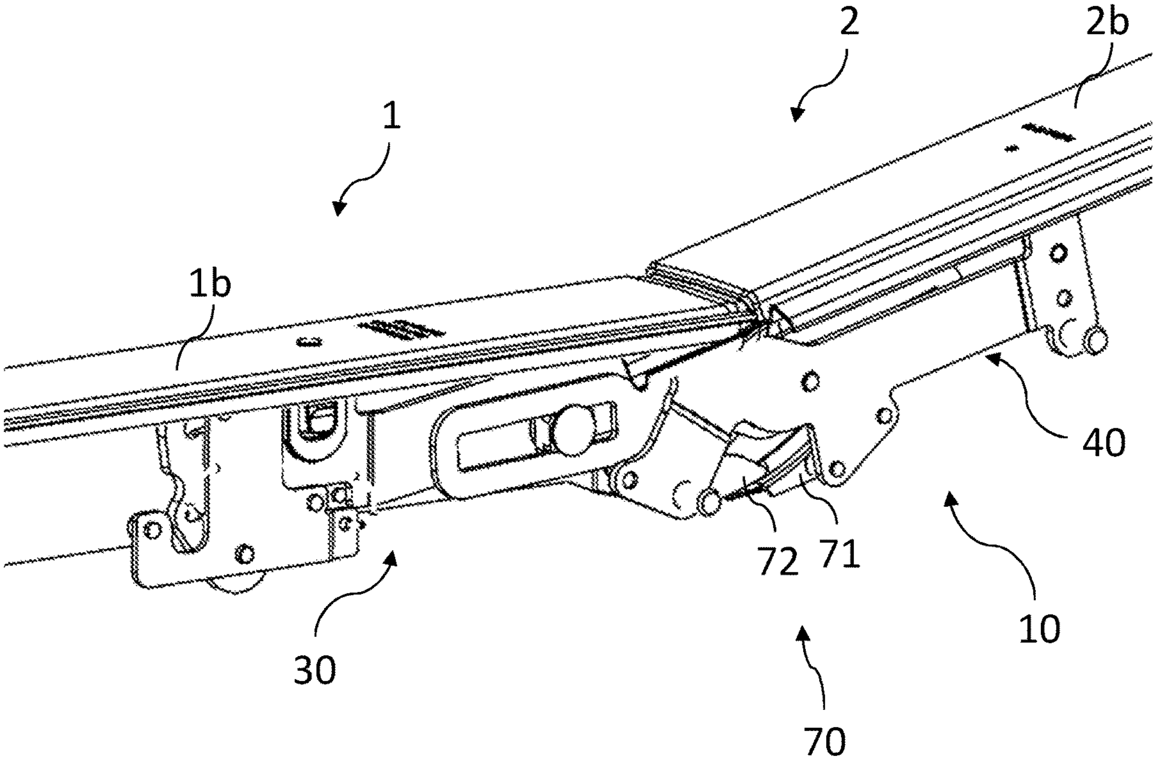
FIGS. 13 and 14 are partial perspective views of the roof window in a further embodiment of the invention.
Figure 14:
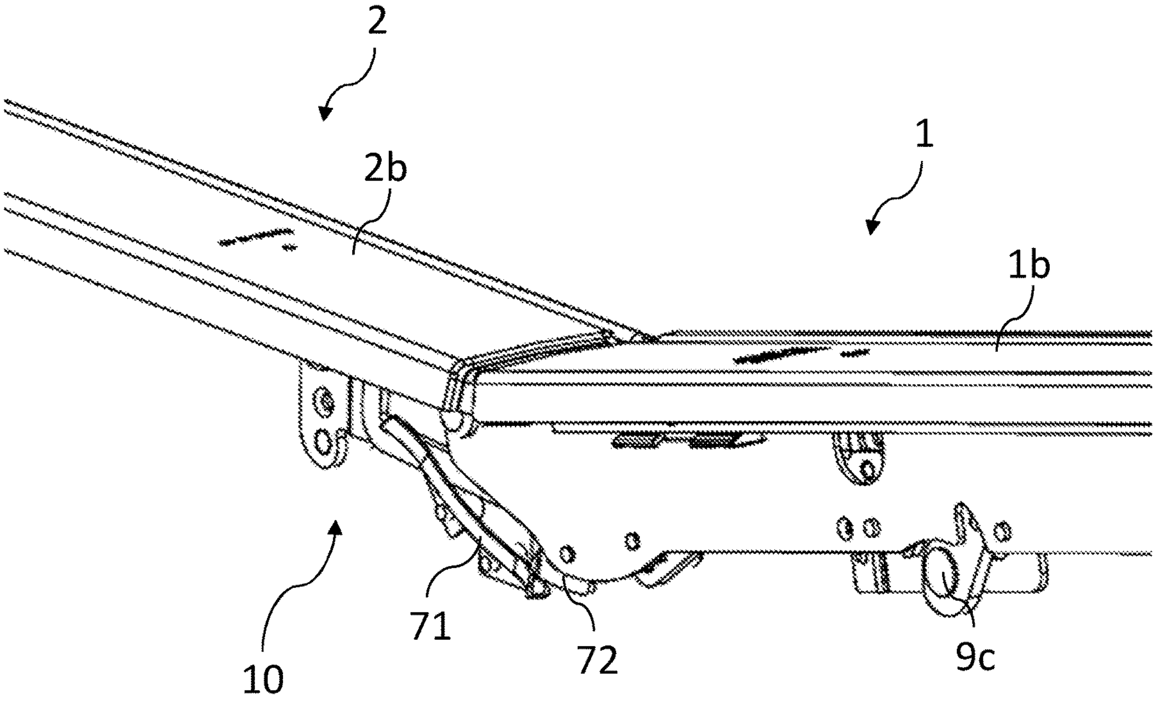

A further feature of the invention is shown in FIGS. 13 and 14 indicating a further embodiment.

Here, an additional engagement device 70 is provided to pull the frame hinge part 30 and the sash hinge part 40 together when the roof window is moved from the second operational condition to the first operational condition.

The additional engagement device 70 here comprises a pull plate 71 fastened to the sash hinge part 40 and an alignment slider 72 fastened to the intermediate frame 6.

The invention is not limited to the embodiments shown and described in the above, but various modifications and combinations may be carried out.

LIST OF REFERENCE NUMERALS

1 frame
1*a* frame side member
1*b* frame side covering element
1*c* side frame support element
1*d* side frame covering
1*e* top covering
2 first secondary frame/sash
2*a* sash side member
2*b* sash side covering element
3 pane
4 operating and locking assembly
5 handle
6 second secondary frame/intermediate frame
6*a* profile element of intermediate frame
6*a*1 slot
6*b* inner element of intermediate frame
7 lifting device
7*a* spring assembly
7*b* lifting arm
7*c* sledge system
8 top hinge arrangement
9 latch arrangement
9*a* spring
9*b* hook element
9*c* rotational joint
9*d* support plate
9*e* cover
$\alpha$1 first hinge axis
$\alpha$2 second hinge axis
10 hinge arrangement
30 frame hinge part
31 base plate
31*a* base plate rivet
34 holding clip
35 sliding joint
35*a* sliding block
39 recess for hook element 9*b* of latch arrangement 9
40 sash hinge part
41 base plate
43 spigots
44 holding clip
46 sliding joint
46*a* sliding block
50 sash link
51 hinged joint
52 guide track
55 bearing axle
60 frame link
61 hinged joint
67 guide track
70 additional engagement device
71 pull plate
72 alignment slider

The invention claimed is:

1. A roof window comprising:

a stationary primary frame having a plurality of frame members including at least two opposing side members, a first secondary frame including a sash having a plurality of sash members including at least two opposing side members, a second secondary frame including an intermediate frame, a lifting device including a spring assembly acting on a lifting arm inserted between the stationary primary frame and the intermediate frame, the lifting arm being at one end rotatably connected with a sledge system slidably connected with the stationary primary frame and coupled to the spring assembly, and at another end rotatably connected with the intermediate frame, a top hinge arrangement connected to the stationary primary frame and to the sash and the intermediate frame to define a first hinge axis at or near a top of the roof window in a first operational condition of the roof window, and a hinge arrangement comprising a set of hinges connected to the intermediate frame and to the sash to define a second hinge axis of the roof window to provide a second operational condition of the roof window, each hinge of said set of hinges comprising a frame hinge part, a sash hinge part, and a movement supporting assembly comprising guiding means configured to allow the sash hinge part to assume an angle relative to the frame hinge part substantially around said second hinge axis during an opening movement from a closed position to an open position and during a closing movement from the open position to the closed position in the second operational condition of the roof window, the frame hinge part of each hinge being connected to the intermediate frame, and the sash hinge part of each hinge being connected to one of said sash side members, the frame hinge part comprising a base plate defining a hinge plane substantially perpendicular to the second hinge axis of the roof window and the sash hinge part comprising a base plate substantially parallel to the base plate of the frame hinge part, the guiding means comprise a linkage mechanism including at least two links providing connection between the sash hinge part and the frame hinge part, each link being connected to at least one of the frame hinge part and the sash hinge part at a joint and connected to each other in a bearing axle, that at least one of the joints between the links and the frame and sash hinge parts comprises a sliding joint cooperating with a guide track and at least one other joint of said joints is selected from the group consisting of a sliding joint and a hinged joint, that the at least two links comprise a sash link providing connection between the bearing axle and the frame hinge part, and a frame link providing connection between the bearing axle and the sash hinge part, wherein one guide track is provided in a respective link of the linkage mechanism, such that a stable movement in the guide track is achieved, and wherein the frame link is connected to the sash hinge part in the at least one of the joints comprising the sliding joint and the sash link is connected to the frame hinge part in a sliding joint.

2. The roof window according to claim 1, wherein the guide track is provided in the sash link and the frame link, and the sliding joint is provided on the frame hinge part and/or the sash hinge part.

3. The roof window according to claim 1, wherein the sliding joint comprises a pin, axle and/or a sliding block.

4. The roof window according to claim 1, wherein the frame link is connected to the frame hinge part in a hinged joint and/or the sash link is connected to the sash hinge part in a hinged joint.

5. The roof window according to claim 1, wherein the intermediate frame comprises a profile element and optionally an inner element.

6. The roof window according to claim 1, wherein the sash hinge part is connected to the sash by a set of spigots.

7. The roof window according to claim 1, wherein the frame hinge part is connected to the intermediate frame by means of a coupling device comprising a first engagement means and a second engagement means.

8. The roof window according to claim 5, wherein a first engagement means comprise a rivet on the base plate of the frame hinge part configured to engage with a slot in the profile element, and wherein a second engagement means comprise a latch arrangement including a rotatable hook element configured to engage releasably with a recess in the base plate.

9. The roof window according to claim 8, wherein said latch arrangement is biased by a spring.

10. The roof window according to claim 8, wherein said latch arrangement comprises a support plate fastened to the profile element of the intermediate frame, the support plate having such an extension that a rotational joint for the hook element is located below the intermediate frame when the roof window in use is mounted in an inclined roof.

11. The roof window according to claim 10, wherein the latch arrangement comprises a cover.

12. The roof window according to claim 1, wherein an additional engagement device is provided to pull the frame hinge part and the sash hinge part together when the roof window is moved from the second operational condition to the first operational condition.

13. The roof window according to claim 12, wherein the additional engagement device comprises a pull plate fastened to the sash hinge part and an alignment slider fastened to the intermediate frame.

* * * * *